US005343371A

United States Patent [19]

Kobayashi et al.

[11] Patent Number: 5,343,371

[45] Date of Patent: Aug. 30, 1994

[54] VEHICULAR PROJECTION-TYPE HEADLAMP

[75] Inventors: Shoji Kobayashi; Masaaki Ishikawa, both of Shizuoka, Japan

[73] Assignee: Koito Manufacturing Co., Ltd., Tokyo, Japan

[21] Appl. No.: 94,216

[22] Filed: Jul. 20, 1993

[30] Foreign Application Priority Data

Jul. 24, 1992 [JP] Japan ............................ 4-052243[U]

[51] Int. Cl.$^5$ ............................................ B60Q 1/04

[52] U.S. Cl. ...................................... 362/61; 362/276; 362/284; 362/324

[58] Field of Search .................. 362/61, 80, 280, 282, 362/284, 305, 323, 324, 276

[56] References Cited

U.S. PATENT DOCUMENTS 4,875,141 10/1989 Miyauchi et al. ............... 362/324 X
5,060,120 10/1991 Kobayashi et al. .................. 362/61
5,068,768 11/1991 Kobayashi ........................... 362/61
5,138,540 8/1992 Kobayashi et al. ................ 362/268
5,158,352 10/1992 Ikegami et al. ................. 362/284 X

*Primary Examiner*—Stephen F. Husar
*Attorney, Agent, or Firm*—Sughrue, Mion, Zinn, Macpeak & Seas

[57] ABSTRACT

A projection headlamp for cars has a substantially elliptical reflector 14, a light source 12 located at the first focal point of the reflector 14, a projection lens 16 disposed in front of the reflector 14, and a shade 20 located at a position near to the second focal point of the reflector 14 and the focal point of the projection lens 16, and the shade 20 partially intercepting light beams going from the reflector 14 toward the projection lens 16. The shade 20 is formed of a tubular member having a step 23 for forming preset light beam distribution patterns. The step 23 spirally extends on the circumferential outer surface of the tubular member in the axial direction. The shade 20 is rotatable about the horizontal shaft 24 of the reflector 14. With the rotation of the shade 20, a step position of the distribution pattern horizontally slides.

15 Claims, 4 Drawing Sheets

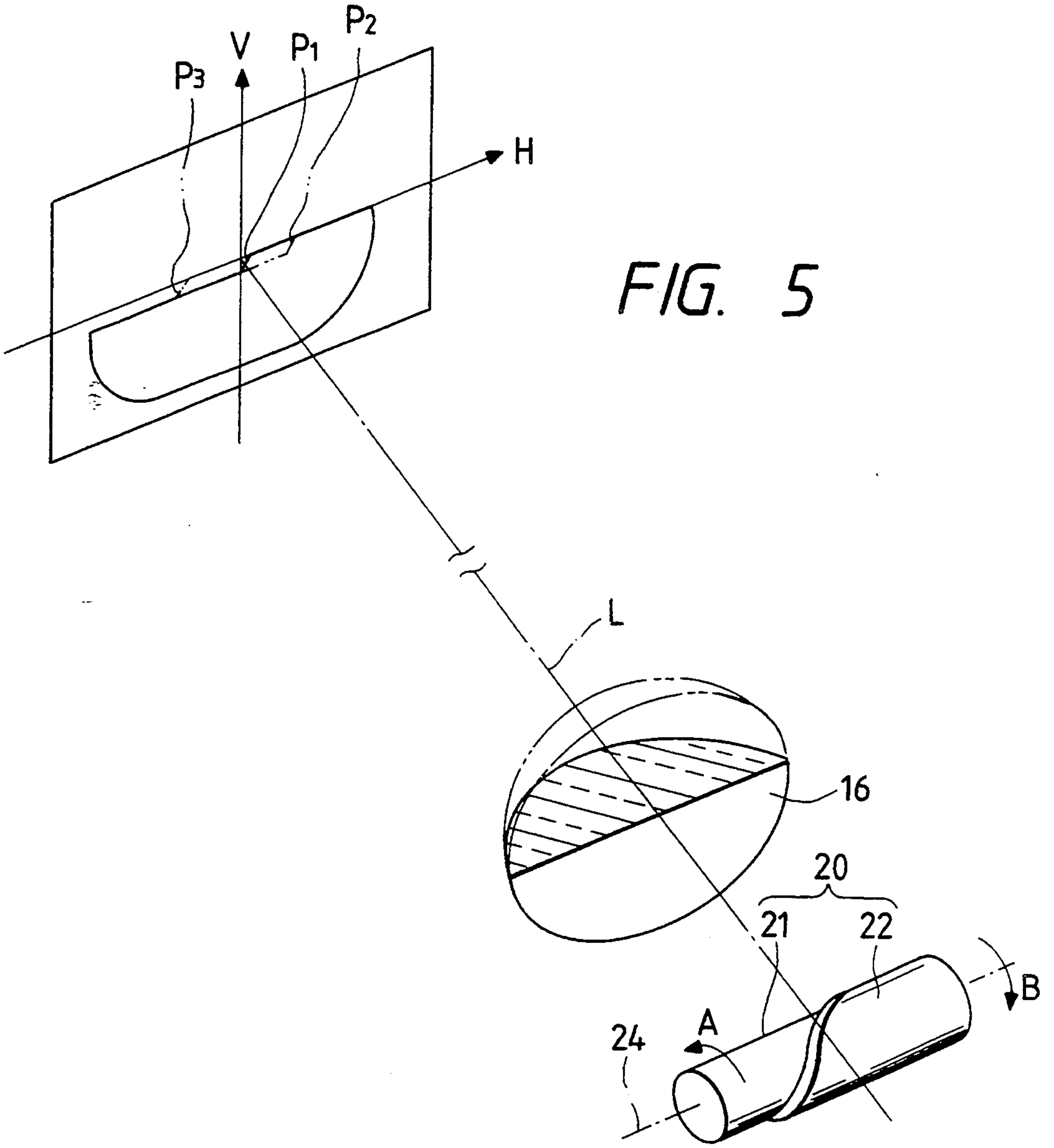
FIG. 5
FIG. 6
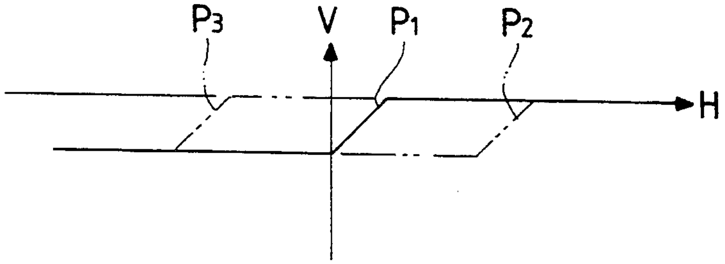

VEHICULAR PROJECTION-TYPE HEADLAMP

BACKGROUND OF THE INVENTION

1. Field of the Invention

The present invention relates to a projection headlamp of the type in which light beams reflected by a substantially elliptical reflector are projected forward by a projection lens. More particularly, the invention relates to a projection headlamp for automobiles capable of selectively changing a beam distribution pattern from one pattern to another by tilting a shade.

2. Discussion of the Related Art

Conventional headlamps of this type are disclosed in an Unexamined Japanese Utility Model Application (OPI) No. Sho. 63-41801 and Unexamined Japanese Patent Application (OPI) No. Hei. 1-213901. The headlamp of the former Japanese publication is constructed as shown in FIG. 1. As shown, a light source 3 is positioned at the first focal point F1 of a reflector 2 which has a substantially elliptical shape, and a shade 4 is located near the second focal point F2. A projection lens 5 is disposed in front of the shade 4. In the headlamp thus constructed, for selectively changing a beam distribution pattern from one beam pattern to another, for example, a subbeam distribution pattern to a main beam distribution pattern, the shade 4 is rotated about a horizontal support shaft O, to partially intercept light beams directed toward a projection lens 5. In the figure, reference numeral 1 designates a lamp body, and numeral 6, a front lens.

The headlamp of the latter conventional Japanese Patent publication employs shade rotating means (not shown) different from that of the former Japanese Utility Model publication, but the headlamps are both based on the same idea that, to select the main beam distribution pattern or the sub-beam distribution pattern, the shade is rotated.

The conventional headlamps thus constructed is capable of selecting one of merely two patterns, i.e., the main beam distribution pattern and the sub-beam distribution pattern. In other words, it cannot freely select a beam distribution pattern, e.g., a medium beam distribution pattern of a middle state between the main beam and sub-beam distribution patterns.

To cope with this, the present inventors have proposed a technique as disclosed in a co-assigned U.S. patent application Ser. No. 08/070,902 filed on Jun. 3, 1993. In this technique, as apparently illustrated in FIG. 2, a shade a is formed of a rotary tubular body having a step a. The rotational axis c of rotation of the shade a is eccentric with respect to the axis of the shade a. Accordingly, when the shade a is rotated, the clear cut line of the light beam distribution pattern vertically moves between clear cut lines Pa and Pb as shown in FIG. 2. Thus, in the construction of the headlamp of FIG. 2, the clear cut line is movable vertically.

However, it is more preferable that the shade and the step move also horizontally along the axis not only moves vertically, because in driving an automobile with the headlamps of the right-side beam distribution patterns, when a driver turns the automobile to the right, he would have a difficulty to see well the right corner, and vice-versa.

SUMMARY OF THE INVENTION

The present invention has been made in view of the above circumstances, and it is an object of the invention to provide a unique shade for use in a vehicular projection headlamp which is capable of freely changing light distribution pattern.

Another object of the invention is to provide a shade for use in a vehicular projection headlamp which can secure a good visual recognition without giving a glare to the driver of the automobiles running in the opposite direction by moving horizontally the clear cut line in accordance with environmental conditions on driving, such as presence of automobiles running in the opposite direction or forerunning automobiles, and geometrical shapes (curved to the right or left) of a road extending frontward.

The above and other objects can be achieved by a provision of a projection headlamp for automobiles having a substantially elliptical reflector, a light source located at the first focal point of the reflector, a projection lens disposed in front of the reflector, and a shade located at a position near to the second focal point of the reflector and the focal point of the projection lens, the shade partially intercepting light beams going from the reflector toward the projection lens, and the shade being rotatable about the horizontal shaft of the reflector to change the beam distribution pattern, wherein the shade is formed of a tubular member having a step for forming preset light beam distribution patterns, and the step spirally extending on the circumferential outer surface of the tubular member in the axial direction.

In the projection headlamp for automobiles thus constructed, with rotation of the shade about the horizontal support shaft, the step of the shade moves horizontally with respect to the optical axis of the headlamp, when viewing from a front side of the headlamp. The clear cut line corresponding to the step also moves horizontally.

The nature, principle, and utility of the invention will be more clearly understood from the following detailed description of the invention when read in conjunction with the accompanying drawings.

BRIEF DESCRIPTION OF THE DRAWINGS

FIG. 5 is a perspective view showing a light beam distribution pattern formed by the headlamp when seen from the driver side; and FIG. 6 is an explanatory diagram showing a shift of the clear cut line in the light beam distribution pattern formed by the same headlamp.

DESCRIPTION OF THE PREFERRED EMBODIMENTS

The preferred embodiment of the present invention will be described with reference to the accompanying drawings.

Figure 1:
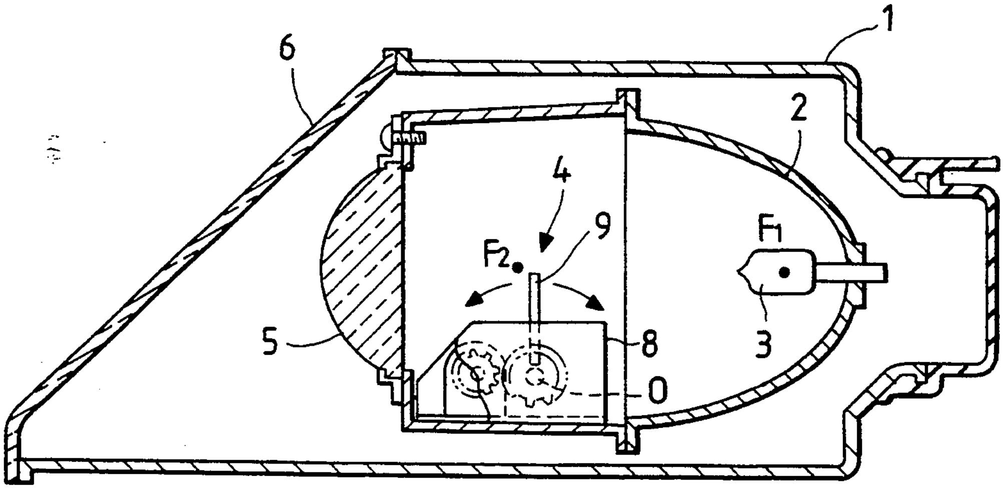
FIG. 1 PRIOR ART
FIG. 1 is a longitudinal sectional view showing a conventional headlamp.
Figure 3:
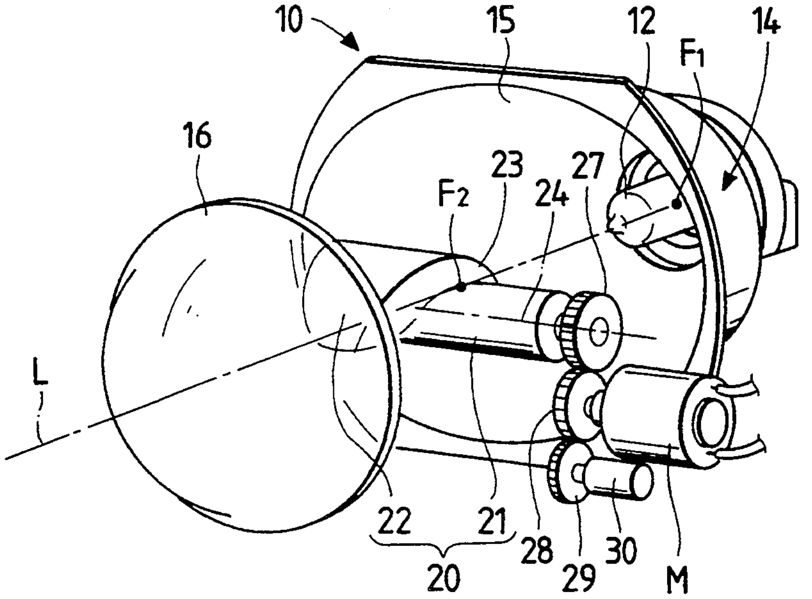
FIG. 3 is a perspective view showing the inner structure of a projection headlamp for cars according to an embodiment of the present invention.
Figure 2:
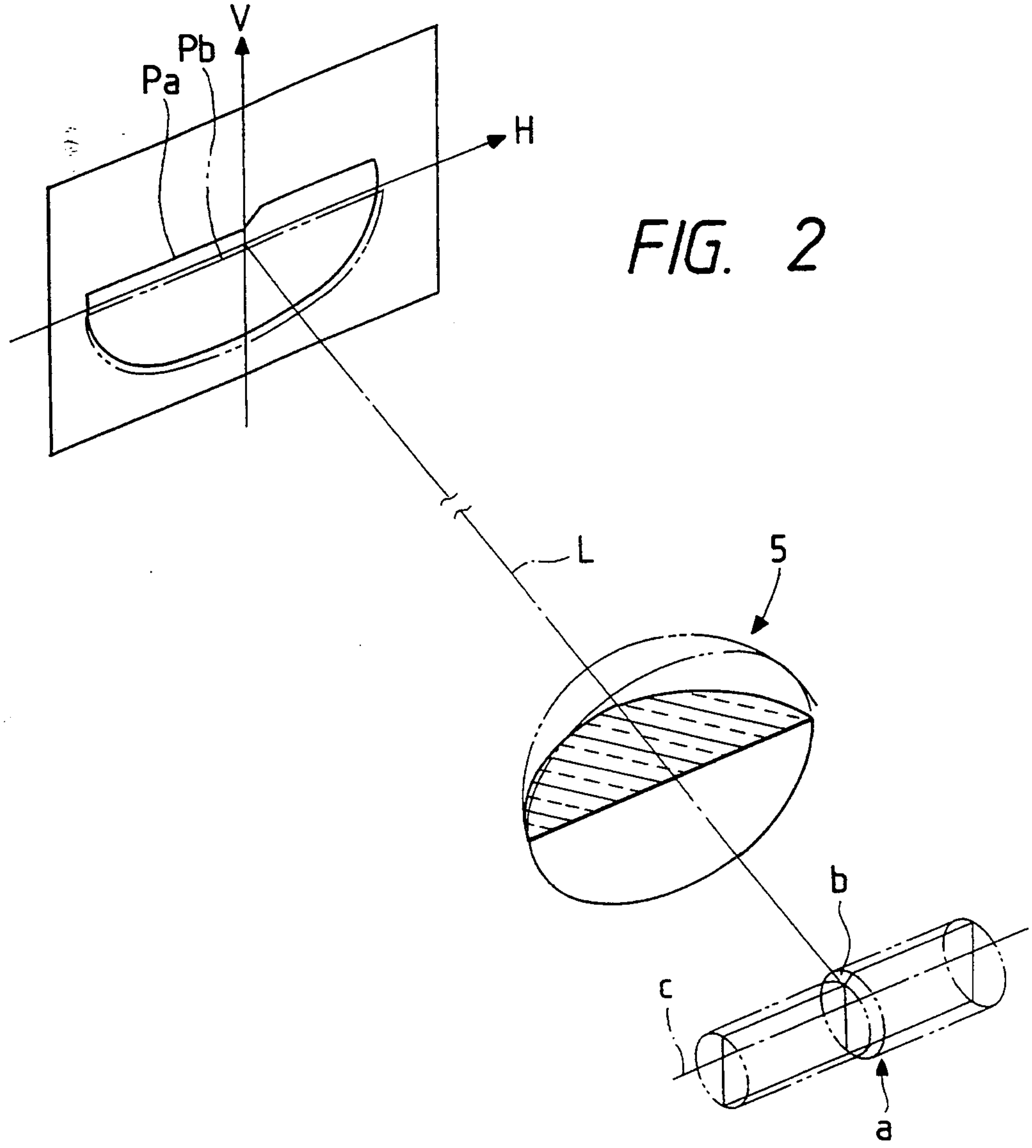
FIG. 2 is a perspective view showing a key portion of a conventional shade-inclinable headlamp already proposed by the present inventors.
Figure 4:
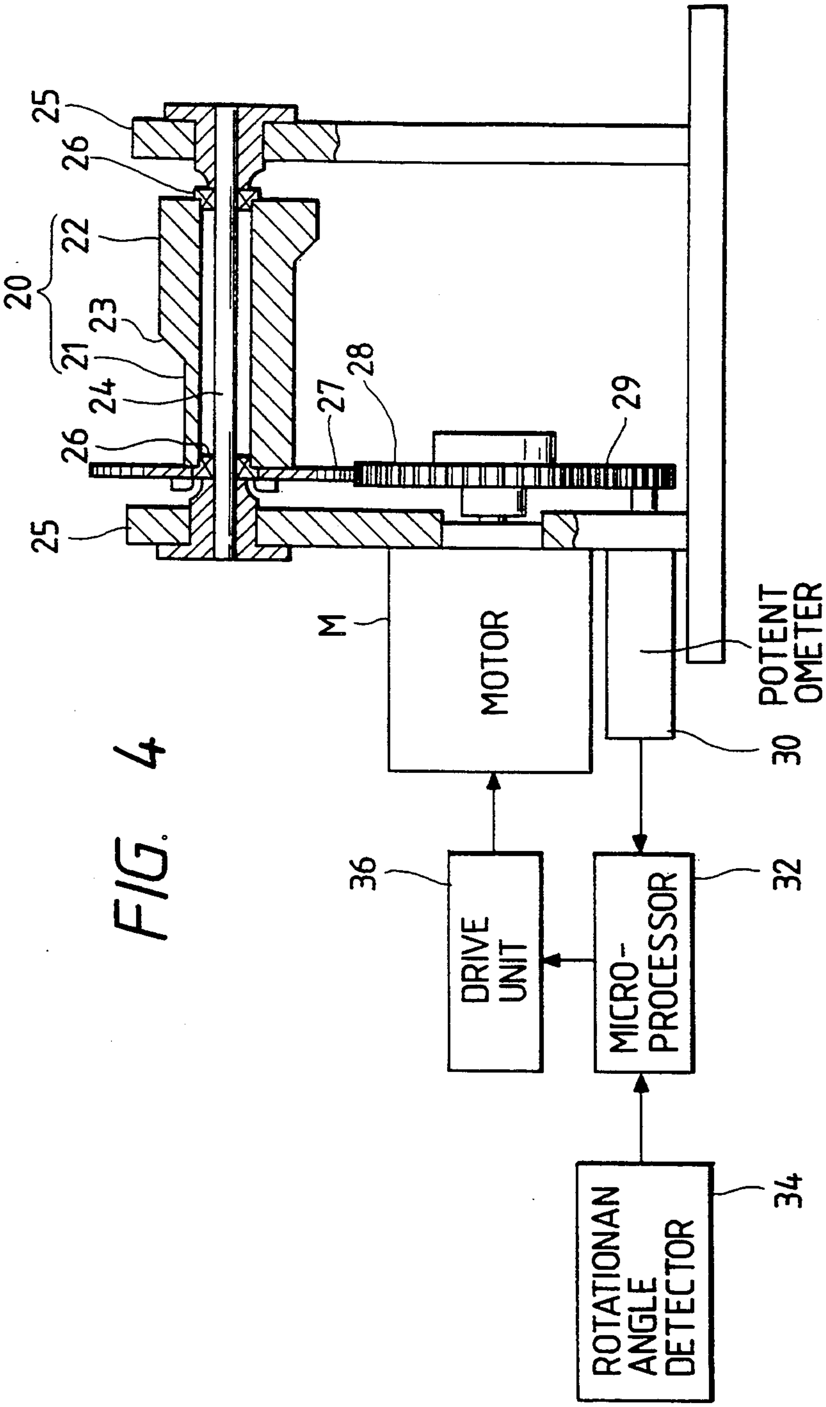
FIG. 4 is a longitudinal sectional view showing a shade in the headlamp of FIG. 3 when seen from the bulb side.

FIG. 3 is a perspective view showing the inner structure of a projection headlamp for automobiles according to an embodiment of the present invention. FIG. 4 is a longitudinal sectional view showing a shade in the headlamp of FIG. 3 (when seen from the bulb side). FIG. 5 is a perspective view showing a light beam distribution pattern formed by the headlamp when seen from the driver side. FIG. 6 is an explanatory diagram showing a shift of the clear cut line in the light beam distribution pattern formed by the same headlamp.

In those figures, a projection unit 10, supported by an aiming mechanism (not shown), is provided with a lamp body shaped like a capsule (also not shown). The projection unit 10 is inclinable about the horizontal shaft and the vertical shaft (not shown) by the aiming mechanism. The aiming direction of the light beams projected from the projection unit 10, viz., the projection axis (optical axis) L of the headlamp, can be inclined back and forth as well as to the left and right through the aiming mechanism.

The projection unit 10 includes a substantially elliptical reflector 14 into which a halogen bulb 12 is fitted and a projection lens 16 located in front of the reflector 14, the reflector 14 and the projection lens 16 being firmly coupled together into a one-piece construction. The projection lens 16 is supported by a lens holder (not shown) fastened to the reflector 14 by means of screws. An elliptical reflecting surface 15 having first and second focal points $F_1$ and $F_2$ (this technique is well known) is formed on an inner surface of the reflector 14. A filament as a light source of the halogen bulb 12 is located at the first focal point $F_1$. A shade body 20 is located at the focal position of the projection lens 16, near to the second focal point $F_2$. The shade body 20 blocks a part of the light beams which are reflected by the reflector 14 and direct to the projection lens 16, thereby forming a clear cut line. The light beams emitted from the halogen bulb 12 are reflected by the reflecting surface 15 and guided forward, and arranged into substantially parallel light beams by the projection lens 16.

As illustrated in FIGS. 3 and 4, the shade body 20 is formed of a rotary tubular member consisting of a right shade member 21 (as viewed from the projection lens side) and a left shade member 22 (as viewed from the projection lens side). The right shade member 21 is smaller in diameter than the left shade 22. A step 23 demarcates the right and left shade members one from the other. The step 23 spirally extends on the circumferential outer surface of the tubular member or shade body 20 in the axial direction. The tubular member (shade body) 20 is rotatable about a horizontal support shaft 24, coaxial with the tubular member. With rotation of the tubular member 20, the position of the step 23 on the clear cut line moves horizontally because the step extends spirally. A frame 25 fixedly supports the horizontal support shaft 24. The frame 25 is fixed to a lens holder (not shown) of the projection unit 10. A bearing 26 is inserted between the horizontal support shaft 24 and the tubular member 20. A follower gear 27 radially extends from one end of the tubular member 20. The follower gear receives a rotation drive force from a drive motor M supported by the frame 25, through a drive gear 28.

The shade body 20 for forming the right-side beam distribution patterns is designed according to the United States and European standards. The shade body 20 forms a clear cut line patterned denoted as $P_1$ illustrated in FIG. 5 when it is set to the position as shown in FIGS. 3 and 4. With rotation of the shade body 20, the clear cut line shifts horizontally. When the shade rotates in the direction of an arrow A in FIG. 5, it takes a pattern denoted as $P_2$. When the shade rotates reversely, in the direction of an arrow B, it takes a pattern of $P_3$. When the automobile runs on a road curved to the left, the beam distribution pattern $P_1$ provides a poor visual recognition. However, in the distribution pattern $P_3$ in which the step position is shifted to the left to which the road is curved, the clear cut line is shifted to the left. Accordingly, the patter $P_3$ provides a visual recognition correspondingly improved.

A gear 29 is coupled with a potentiometer 30 by means of a shaft. The potentiometer 30 detects a lateral position of the step 23 on the top edge line of the shade body 20, i.e., a rotational angle of the shade body 20. This position is referred to as a horizontal position. A microcomputer performing as a central processing unit 32 receives angle data from an rotation angle detector 34 for detecting a rotation angle of the steering of the automobile, and turns a drive motor M by a quantity of drive calculated using the angle data received. The microcomputer 32 stores a table containing preset rotation angles of the steering and the horizontal positions (rotation angles of the shade body 20) of the step 23, which are optimumly selected in connection with the preset rotation angles. The microcomputer 32 receives the steering rotation angle data from the rotation angle detector 34, and produces a signal that is formed on the basis of the received angle data, to a drive unit 36. A drive signal of the drive unit 36 drives the drive motor M, which in turn rotates the shade body 20. The step 23 of the shade body 20 is operated to move up to an optimum horizontal position.

In the embodiment as mentioned above, a quantity of rotation (a quantity of horizontal slide of a portion corresponding to the step in the distribution pattern) of the shade body 20 for 45° cut line shaping is adjusted using a quantity of rotation of the steering. However, the invention is not limited thereto or thereby. For example, the shade member for 15° cut line shaping may be used instead of the shade for 45° cut line shaping.

Where the oppositely running automobile and the forerunning automobile are absent in the fore scene, the distribution pattern $P_3$ providing a good visual recognition for a distance. Where those cars are present, the microcomputer receives an output signal of a sensor for sensing light from the headlamps of the oppositely running automobile or the tail lamp of the forerunning automobile, and suitably operates to rotate the shade according to the received sensor signal, to set the distribution pattern of the headlamp to the distribution pattern $P_1$ or $P_2$.

Further, a discharge bulb may be used instead of the halogen bulb, which is used in the above-mentioned embodiment. The discharge lamp provides a better visual recognition since the quantity of light emitted from the discharge lamp is larger than that of the halogen lamp.

While preferred embodiments of the invention have been described, it will be obvious to those skilled in the art that various changes and modifications may be made thereto without departing from the invention, and it is aimed, therefore, to cover in the appended claim all such changes and modifications as fall within the true spirit and scope of the invention.

As seen from the foregoing description, in the projection headlamp for automobiles of the invention, with rotation of the shade about the horizontal support shaft, the step of the shade moves horizontally with respect to the optical axis of the headlamp, viewing from a front side of the headlamp. The clear cut line corresponding to the step also moves horizontally. Accordingly, the distribution pattern can be moved horizontally in conformity with the environmental conditions on driving. The driver's visual recognition in the fore scene is remarkably improved. Particularly, when the automobile rotates to the right or left, the shade rotation interlocked with the steering operation considerably improves the visual recognition in the fore scene.

What is claimed is:

1. A projection type headlamp for an automobile, comprising:

a substantially elliptic reflector having a reflecting surface on an inner surface thereof;

a light source fitted into said reflector, said light source being located at a first focal point of said reflector;

a projection lens disposed in front of said reflector; and shade means for cutting at a predetermined position a part of light beam emitted from said light source and reflected by said reflector, said shade means being provided between said reflector and said projection lens in the vicinity of a second focal point of said reflector and substantially at a focal point of said projection lens, said shade means rotating along a horizontal axis thereof for forming variable light distribution patterns, said shade means deviating in a horizontal direction in response to its rotation, said shade means comprising a first tubular shade member, a second tubular shade member having a diameter smaller than said first shade member, and a step portion disposed between said first and second shade members, said step portion Spirally extending on a circumferential outer surface of said tubular shade member in the axial direction.

2. The projection type headlamp of claim 1, wherein the spiral shape of said step portion having a predetermined angle whereby a quantity of horizontal deviation of a portion corresponding to said step portion in the light distribution pattern by said shade means is adjusted using a quantity of rotation of a steering of the automobile.

3. The projection type headlamp of claim 2, wherein said predetermined angle is 45°.

4. The projection type headlamp of claim 2, wherein said predetermined angle is 15°.

5. The projection type headlamp of claim 1, wherein said light source comprises a halogen bulb.

6. The projection type headlamp of claim 1, wherein said light source comprises a discharge-type bulb.

7. A system for deviating a shade means for forming a light distribution pattern by cutting at a predetermined position a part of light beam emitted from a light source and reflected by a reflector, said system comprising:

a drive means for driving said shade means to rotate;

a first means for detecting a quantity of deviation of said shade means;

a second means for detecting a rotational angle of a steering of an automobile; and a control means for controlling said drive means in according with outputs from said first detecting means and said second detecting means;

said shade means comprising a first tubular shade member, a second tubular shade member having a diameter smaller than said first shade member, and a step portion disposed between said first and second shade members, said step portion spirally extending on a circumferential outer surface of said tubular shade members in the axial direction, wherein said shade rotates along a horizontal axis thereof for forming variable light distribution patterns, said shade means deviating in both vertical and horizontal directions during its rotation.

8. The system of claim 7, wherein the spiral shape of said step portion having a predetermined angle whereby a quantity of horizontal deviation of a portion corresponding to said step portion in the light distribution pattern by said shade means is adjusted using a quantity of rotation of a steering of the automobile.

9. The system of claim 8, wherein said predetermined angle is 45°.

10. The system of claim 8, wherein said predetermined angle is 15°.

11. The system of claim 7, wherein said light source comprises a halogen bulb.

12. The system of claim 7, wherein said light source comprises a discharge-type bulb.

13. The system of claim 7, further comprising a frame fixed to the headlamp body, wherein said drive means comprises a motor operatively engaging with said shade means through gears, said motor being fitted to said frame, said first detection means comprises a potentiometer engaging with said motor through a gear, said potentiometer being fixed to said frame.

14. The system of claim 7, wherein said control means comprises a microcomputer electrically connected to said first detection means and said second detection means.

15. The system of claim 13, wherein said gear engaging said motor rotates along said horizontal axis of said shade means through a bearing.

* * * * *